Jan. 16, 1968      E. C. BEST      3,364,484

LOW AMBIGUITY RADAR SCANNING

Filed Sept. 9, 1963      5 Sheets-Sheet 1

INVENTOR.
ETHRIDGE C. BEST
BY

INVENTOR.
ETHRIDGE C. BEST

United States Patent Office 3,364,484
Patented Jan. 16, 1968

3,364,484
LOW AMBIGUITY RADAR SCANNING
Ethridge C. Best, Nashua, N.H., assignor to Sanders Associates, Inc., Nashua, N.H., a corporation of Delaware
Filed Sept. 9, 1963, Ser. No. 307,536
The portion of the term of the patent subsequent to Apr. 23, 1983, has been disclaimed
27 Claims. (Cl. 343—16)

This invention relates to a method and apparatus for markedly reducing the number of non-existent targets indicated by crossed-line array radar systems. In particular, the invention deals with false target indications caused by range ambiguities present in the reflections of energy radiated in swept beams in such systems. To eliminate such false indications according to the invention, a radar set searches each location in a selected space sector in two different modes so that a target produces echoes that are intercepted during two time intervals. The combination of the two intervals uniquely locates each target in two of the three space coordinates, thereby substantially eliminating the ambiguities inherent in previous measurements along these coordinates.

The invention also comprehends a radar system that locates targets with high efficiency, making possible a reduction in the equipment and the time required for unambiguous target location with crossed-line array systems.

A conventional radar system producing pencil beams electronically steerable along two axes requires an excessive number of antenna elements and phasing devices. Accordingly, some systems instead use two arrays of fan-shaped beams directive along different axes. More specifically, two arrays of stationary fan-shaped beams search the sector of space for reflections of transmitted energy. The fan beams in one array have directivity along one axis, and the beams in the other array are all directive along a second axis. The two axes are at an angle, generally 90°, with each other. As a result, the two arrays provide coordinate information locating an energy reflecting object, hereafter termed a target, along the two different axes, typically the azimuth and the elevation axes. That is, one array of fan beams determines a target's azimuth position and the other array determines its elevation. Such a radar system, utilizing two one-dimensional, multiple fan beam arrays, is termed a crossed-line array system.

When more than one target is in the field of view of the fan beams, following transmission of energy swept along one axis, it is possible for echoes from two or more targets to enter the radar receiver at the same time. As described in detail below, this results in the indication of two or more non-existent targets, commonly termed ambiguous targets or ghosts.

It is an object of the present invention to provide a method and apparatus for substantially eliminating the radar indication of non-existent targets. A more specific object of the invention is to provide a method and apparatus for crossed-line array radar operation which minimizes the indication of non-existent targets.

A further object of the invention is to provide a method and apparatus having the above features and characterized by simple operation.

It is also an object of the invention to provide a radar system of the above character that locates targets with high efficiency. Realization of this object makes possible location of targets with a relatively small amount of equipment in a brief time interval.

Another object of the present invention is to provide a method and apparatus of the above character which can be utilized by modification of existing radar equipment.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosures, and the scope of the invention will be indicated in the claims.

For a fuller understanding of the nature and objects of the invention, reference should be had to the following detailed description taken in connection with the accompanying drawings, in which.

*Crossed-line array radar*

Figure 1:
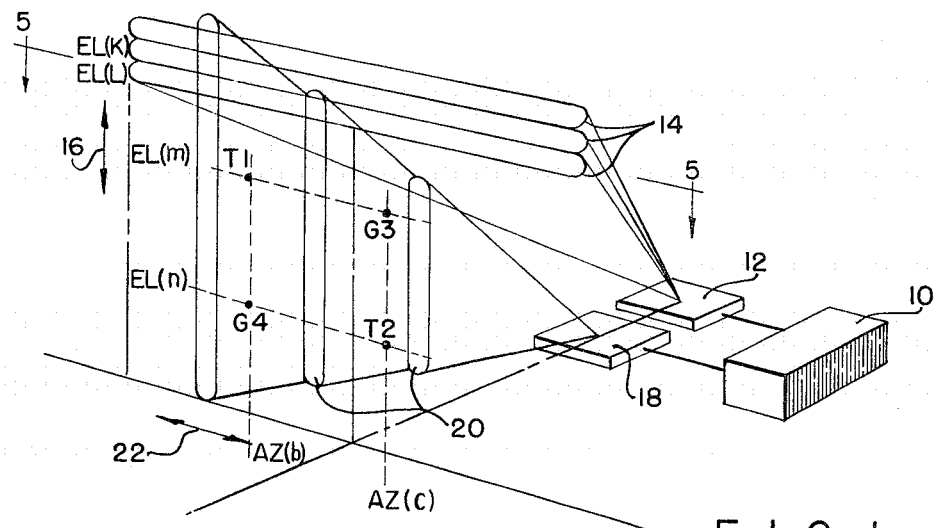
FIG. 1 is a pictorial representation of a crossed-line array radar system.

FIG. 1 shows a crossed-line array radar system having a radar unit 10 connected to an antenna array 12 that produces an "array" of horizontally-extended fan beams 14, each beam being directive along the elevation axis 16. The radar unit is also connected to an antenna array 18 that produces an array of vertically-extending fan beams 20, directive along the azimuth axis 22.

During operation according to the prior art, the radar system transmits energy in a vertically-extending fan beam swept along the azimuth axis 22. A single target T1 is illuminated by the energy and reflects an echo. The radar system scans the azimuth beams 20 and the elevation beams 14 to find one azimuth beam and one elevation beam that both receive an echo at the same time, i.e., from the same range. The azimuth fan beam 20 directed in the azimuth coordinate $Az(b)$ and the elevation beam 14 covering the elevation coordinate $El(m)$ both intercept such an echo, indicating that the target T1 lies in a space cell defined by the angular coordinates $Az(b)$ and $El(m)$. The range coordinate of the cell is identified by the arrival time of the echo, or more specifically by the time interval between transmission of energy and receipt of the echo.

Next consider the effect of a second target T2 whose range is such that an echo from it reaches the radar unit 10 at substantially the same time as the echo from the target T1. The system now registers radar returns in the azimuth beams 20 directed along the coordinates $Az(b)$ and $Az(c)$. It also registers returns at the elevation coordinates $El(m)$ and $El(n)$. However, there is no way of determining which elevation coordinate should be paired with each azimuth coordinate.

Accordingly, the system registers targets not only at the location $(Az(b), El(m))$ and $Az(c), El(n))$, corresponding to the real targets T1 and T2, but also at the location (Az(c), El(m)) and (Az(b), El(n)), corresponding to "ghost" targets G3 and G4. With the present invention, on the other hand, the system indicates substantially no non-existent targets.

General description

According to the illustrated embodiment of the invention, the radar system sweeps the transmitted fan beam along a first axis, for example the azimuth axis, in opposite directions on successive groups of sweeps. A single multiple beam array of fan beams directive along the other axis intercepts the echoes. The radar unit connected to process the echoes indicate the presence of a target in a location, or cell defined by the receipt of echoes in response to the energy radiated in two successive groups of beams swept in opposite directions. As is described below in detail, the arrival times of the two groups of echoes provide sufficient information to uniquely determine the range of the indicated target and its position along the first axis. The identity of the fan beam that intercepted the two groups of echoes identifies the target's position along the second axis. The resultant three-coordinate identification of each target is substantially free of ambiguities. Accordingly, the radar system indicates all real targets but indicates a minimum of ghosts.

In many instances, the resolution along the first axis can be markedly improved by matching the target indications produced as outlined above the echoes intercepted with an array of fan beams having directivity along the first axis. As described in detail below, the additional resolution is achieved in substantially the same brief time used to provide the original target indications. The resultant time saving is of utmost importance in many radar applications.

Constant range and constant time profiles

To understand the invention more fully, several characteristics of a single pulse of energy radiated in a swept fan beam will now be discussed with reference to FIG. 2. This figure shows the field of view or space sector illuminated by a radiant fan beam 24 sweeping in azimuth. Assume that the fan beam 24 radiates from a source 26 and sweeps forward in the direction of arrow 28 from the position Az(1) to the position Az(2). Due to the time required for each sweep, targets positioned at different azimuth positions along a constant range profile 30, i.e., a surface all of whose points are the same range from the source 26, are illuminated at different times. Accordingly, the echoes from these different azimuth positions arrive at the source 26 at different times.

However, by definition, all echoes reflected by targets positioned along a constant time profile 32 arrive at the source 26 at the same time. As indicated in FIG. 2, the range of the constant time profile 32 decreases along the profile from the initial azimuth position Az(1) to the final position Az(2). Specifically, the range to a point on this profile is a function of azimuth, sweep rate and of the propagation velocity of electromagnetic energy. Although for simplicity only a single constant time profile 32 is shown associated with the beam 24 as it sweeps forward, there are a series of such profiles. Moreover since the beam 24 has a finite thickness, energy radiated from the source 26 illuminates each point in the field of view for a finite time. Thus, echoes are received at the same time from a constant time region, a region similar to a constant time profile, but having thickness along the range axis proportional to the time that the radiated energy iluminates the same point. Accordingly, the profile 32 will hereafter be termed a "region."

Figure 2:
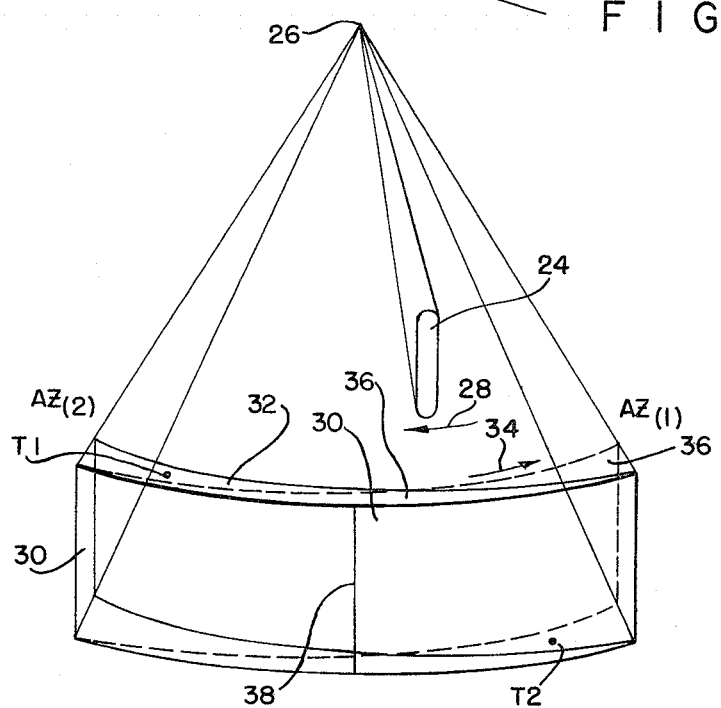
FIG. 2 is a pictorial representation showing characteristics of energy radiated in a swept fan beam, as used in crossed-line array radar systems.

It will now be seen that for the targets T1 and T2 of FIG. 1 to give rise to ghosts G3 and G4, the targets T1 and T2 must lie in the same constant time region, so that echoes therefrom arrive at the source 26, FIG. 2, at the same time after the beam 24 starts sweeping from its initial position Az(1). Otherwise, the ambiguities are readily resolved, and the ghosts consequently eliminated, by timing circuits in the radar unit.

Still considering FIG. 2, when the fan beam 24 sweeps in the reverse direction, indicated by the arrow 34, the constant *range* regions are identical to those associated with the beam 24 sweeping in the forward direction 28. However, a reverse sweep constant *time* region 36, indicated with a dashed line, is different from the corresponding forward sweep constant time region 32, and coincides with it only along a section 38 of the plane that bisects the azimuth interval illuminated by the beam 24.

More specifically, while the range to the region 32 decreases in going from the position Az(1) to the position Az(2), the range to the region 36 decreases in the opposite direction, i.e., as the beam moves toward the position Az(1). The two constant time regions intersect along the planar section 38 where they have the same range.

From the spatial relationship of the forward-sweep and reverse-sweep constant time regions 32 and 36 of FIG. 2, it will be seen that the targets T1 and T2, located at different positions along the same forward sweep constant time region, are located along different reverse-sweep regions. Accordingly, the echoes reflected from the two targets in response to radiation in a beam swept in both the forward direction 28 and the reverse direction 34 arrive at different combinations of times following initiation of the sweeps from which they are reflected. The radar system of the present invention utilizes this time-of-arrival information to combine the echoes reflected from the same target in response to forward-swept and reverse-swept radiated beams. It develops a target response only for echoes received from the space location in response to beams swept in both directions. As a result, the system indicates only the actual targets T1 and T2. The ghosts G3 and G4 (FIG. 1) are not indicated.

Figure 3:
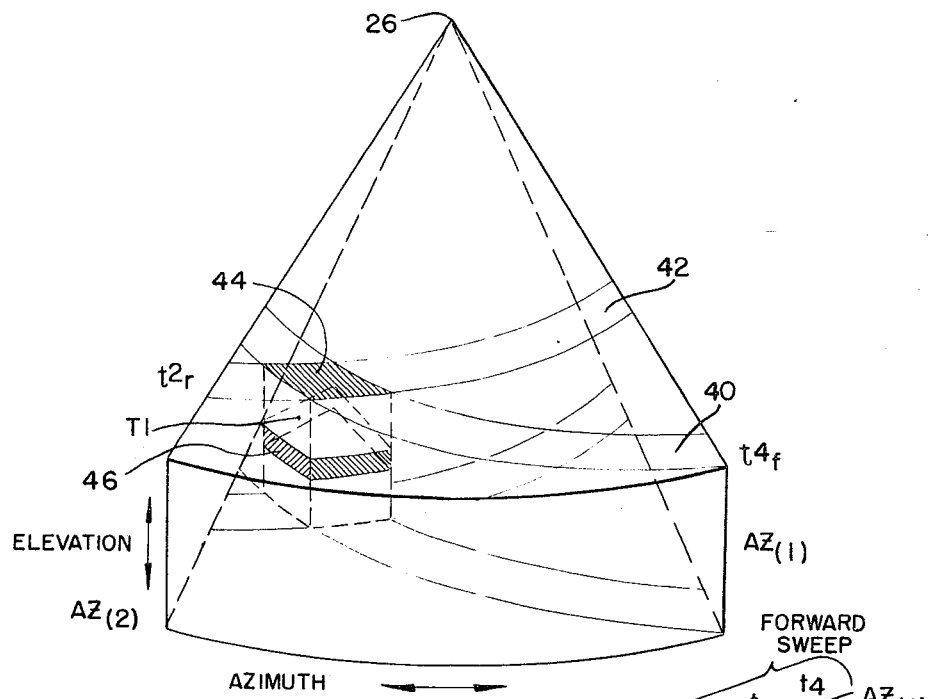
FIG. 3 is a three-dimensional representation, similar to FIG. 2, of the field of view illuminated by energy radiated in a swept fan beam. This figure shows further features of the intersections of oppositely-swept constant time regions.

The manner in which the echoes received from beams swept in opposite directions identify a target's position will now be described with reference to FIG. 3, which shows a field of view similar to that of FIG. 2. Again, let us assume that the radiated energy is in a fan beam that extends along the elevation axis and is directive along the azimuth axis, and that the beam is swept along the azimuth axis. Assume that during a time interval $t4_f$, following radiation of a forward-swept beam, echoes reflected from targets in a constant time region 40 arrive at the source 26. During the time interval $t2_r$, following transmission of a reverse-swept beam, echoes reflected from targets lying within a constant time region 42 arrive at the source 26. As shown in FIG. 3, these two constant time regions intersect, a forming a column 44. The column extends along the azimuth and range axes for fixed distances (shown greatly enlarged) and the constant time regions forming it identify its position along these axes.

Hence, when the target T1 reflects echoes that are intercepted at the source 26 during the time intervals $t4_f$, and $t2_r$, the radar system "knows" that the target is positioned at the range and azimuth coordinates of the column 44.

The antenna system that intercepts the echoes preferably categorizes them according to the elevation coordinate from which they arrive. That is, the receiving antenna delivers to different output ports the echoes received from the different horizontally-extending fan-shaped beams 14 shown in FIG. 1. Such an array of elevation-ordered fan beams, in effect, slices each location column, such as the column 44, into a stack of elevation-ordered segments or cells 46.

It will thus be seen that when the receiving antenna system develops echo signals at the same output port following transmission of a forward swept beam and the successive reverse swept beam, the identification of the output port and of the forward and reverse time intervals in which the echo signals appear identifies a cell in which there is a target. A radar system for effecting location of targets in this manner will now be described with reference to FIG. 4.

Figure 4:
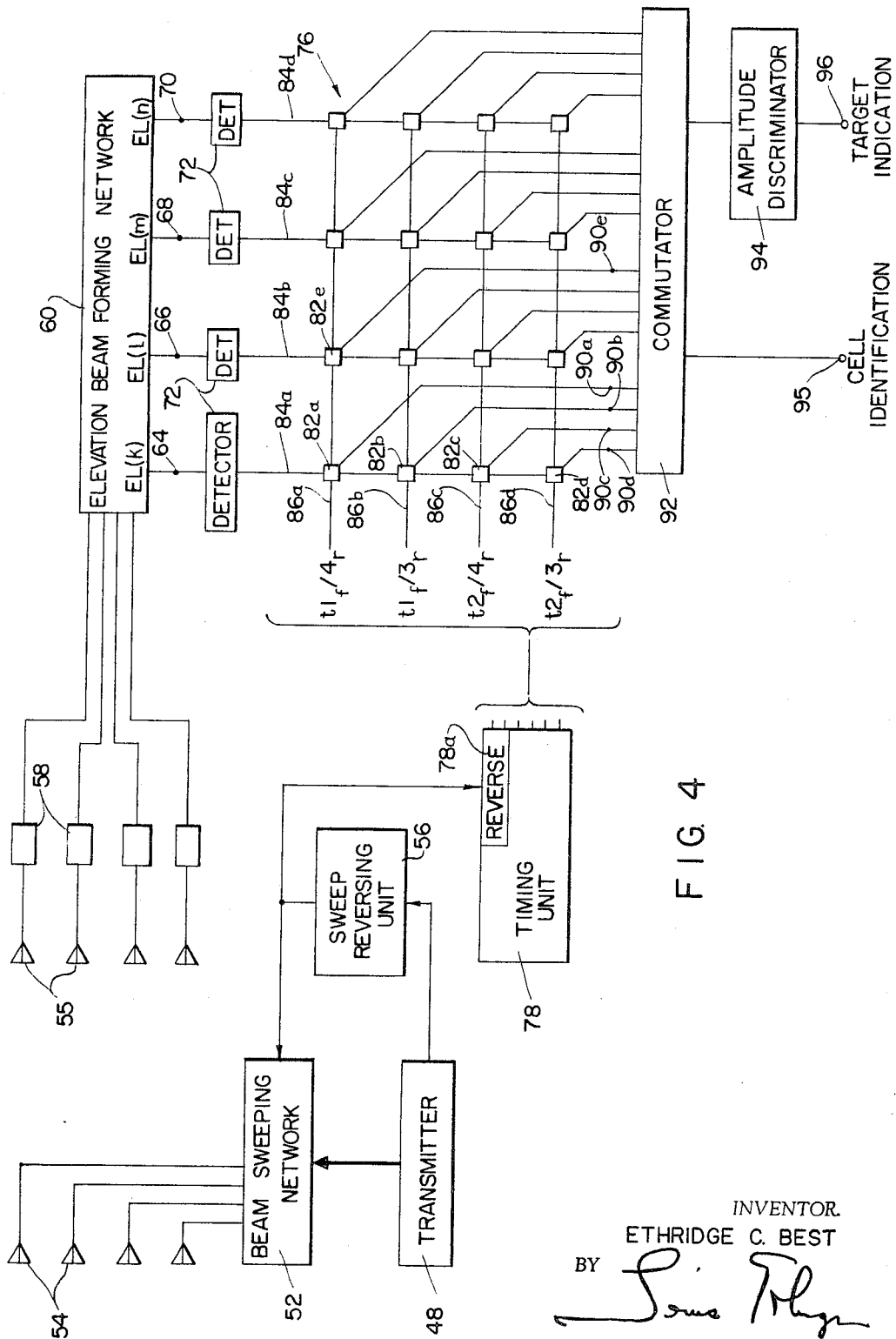
FIG. 4 is a schematic representation in block form of a radar system embodying the invention.

*Radar system of FIG. 4*

As shown in FIG. 4 the system has a transmitter 48 connected with a beam-sweeping network 52. The network 52 energizes an array of antennas 54 to radiate electromagnetic energy in a fan beam that sweeps along the azimuth axis. Conventional constructions well known to skilled radar artisans can be utilized for the network 52. For example, the two-part article "Survey of Electronically Scanned Antennas" by H. Shnitkin, published in the Microwave Journal issues of December 1960 and of January 1961; and "Array Radars" by J. L. Allen, Microwave Journal, May 1962, and the references cited therein, describe several suitable constructions.

The energy radiated in each sweep is preferably in the form of a pulse having a brief duration, e.g., 10 microseconds ($10^{-5}$ seconds), during which the beam sweeps through the space sector being searched, i.e., from the azimuth Az(1) to the azimuth Az(2) of FIG. 2. The transmitted pulses are appropriately repeated every 0.001 second.

A sweep-reversing unit 56 is connected with the transmitter 48 and the beam sweeping network 52 to reverse the sweep direction of the transmitted beam. By way of example, the reversing unit 56 counts the transmitted output pulses and actuates the beam sweeping network 52 to reverse the sweep direction after a selected number of transmitted pulses are swept in one direction. In this manner, successive groups of a selected number of beams, including one beam per group, are swept in opposite directions along the azimuth axis. More specifically, the beam sweeping network 52 typically delivers the transmitter energy to the antennas 54 with the relative phase difference between the energy at adjacent antennas changing to cause the radiated energy to sweep in azimuth. The reversing unit 56 then reverses the sweep direction by reversing the phase difference between adjacent antennas. For example, when the beam sweeping network 52 operates according to the frequency conversion phasing scheme described in the second Shnitkin article, supra, the reversing unit 56 reverses the sweep direction by changing the direction in which the frequency of the variable frequency signal changes.

An array of receiving antennas 55 intercepts echoes of the transmitted energy and delivers echo signals to an elevation beam forming network 60. Conventional protective switching devices 58 are interposed between the network 60 and the antennas 55 to block intercepted transmitted energy from the network 60.

The network 60 introduces a first set of phase delays to the inputs from the antennas 55 to deliver to its output port 64 the echo signals developed from echoes received in the fan beam 14 directed along the elevation coordinate El($k$) (FIG. 1). Simultaneously, the network 60 applies a different set of phase delays to the inputs from the antennas to deliver the echo signals developed from echoes received in the beam directed along the coordinate El($l$) to an output port 66. In a similar manner, the network 60 delivers echo signals developed from echoes received in the beams directed along the elevation coordinates El($m$) and El($n$), respectively, to its output ports 68 and 70.

The articles by Shnitkin and by Allen, cited above, describe several constructions suitable for the elevation beam forming network 60.

Detectors 72 detect the echo signals at the ports 64-70 and apply the detected signals to a first set of conductors 84 of a matrix indicated generally at 76.

As also shown in FIG. 4, a timing unit 78, conventionally comprising a clock and a distributor, develops a pair of pulses at each of a plurality of output terminals. Each such terminal is connected to a conductor 86 of the matrix 76. One pulse in each pair occurs for one time interval following the initial transmission of a beam swept in the forward direction and the other pulse occurs for one time interval following the initial transmission of a reverse-swept beam. The combinations of times during which the pulses in each pair persist are different. Thus, the timing unit 78 delivers pulses during the time intervals $t1_f$ and $t4_r$ to the matrix conductor 86a. Pulses occurring during the time intervals $t1_f$ and $t3_r$ are applied to the matrix conductor 86b and the conductor 86c and 86d receive, respectively, pulses occurring during the time intervals $t2_f$ and $t4_r$, and $t2_f$ and $t3_r$.

The matrix 76 has a coincidence circuit 82 at each vertical-horizontal intersection. The vertical conductor 84 and horizontal conductor 86 forming the intersection provide the inputs to the coincidence circuit 82 and a conductor 90 carries its output. The coincidence circuits 82 appropriately contain gate circuits, described below with reference to FIG. 6, enabled by the timing pulses on conductors 86a–86d to pass the echo signals on conductors 84a–84d to the output conductors 90.

Each coincidence circuit also includes an integrator or equivalent stage to accumulate the echo signals it passes. As a result, the amplitude of the output signal from a coincidence circuit 82 will be at a high level when the circuit receives echo signals during the two time intervals it is enabled and at a low level when it receives an echo signal during only one of these time intervals.

From the above discussion with reference to FIGS. 2 and 3, it will be seen that the presence of the high level output signal from a coincidence circuit indicates the presence of a target in the space cell 46 (FIG. 3) identified by the two time intervals during which the circuit is enabled. Accordingly, a high level signal from a coincidence circuit is a cell-identifying target indication. Specifically, each coincidence circuit 82 in the matrix 76 corresponds to one space cell located at the azimuth and range coordinates identified by the forward-sweep and reverse-sweep time intervals associated with the conductor 86 connected to the coincidence circuit. The conductor 84 connected to the coincidence circuit identifies the elevation position of its corresponding space cell 46.

A commutator 92, also shown in FIG. 4, receives the accumulated echo signals from the coincidence circuits 82 and delivers them in an ordered succession to an amplitude discriminator 94 that passes only the higher level signals to a Target Indication output terminal 96 of the radar system. The commutator 92 also produces a Cell Identification signal at a terminal 95 to identify the cell associated with the coincidence circuit that is being coupled to the discriminator 94. Thus, the signals at the terminals 95 and 96 provide the complete output target indications of the radar system.

*Operation*

Figure 5:
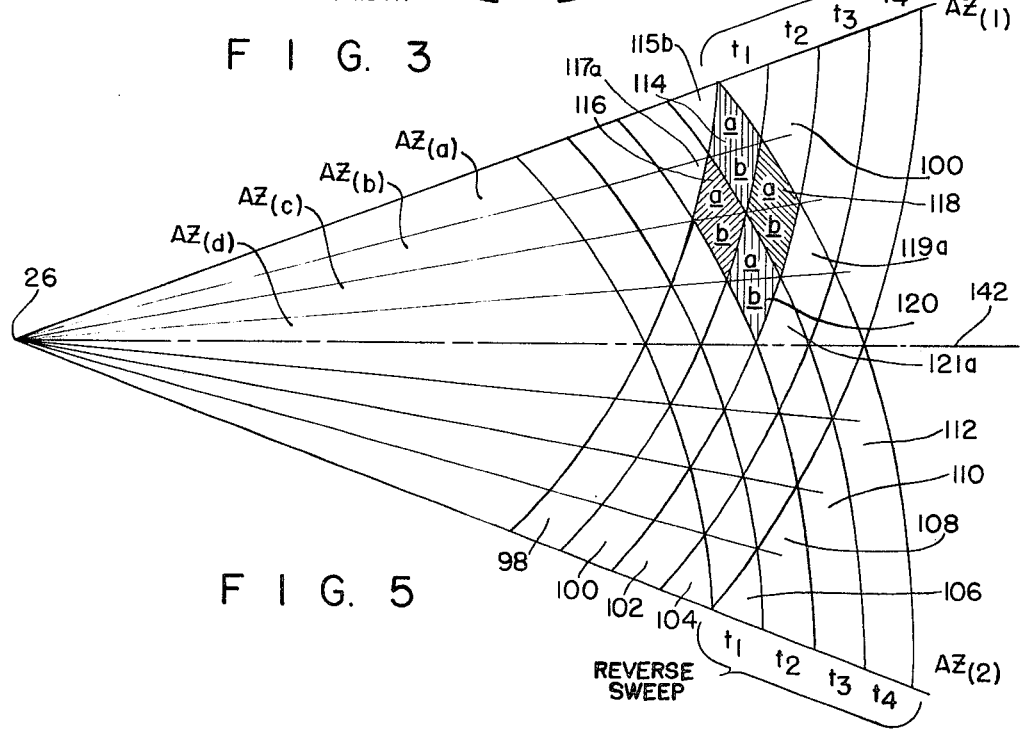
FIG. 5 is an azimuth plane, taken along the line 5—5 of FIG. 1, in the field of view shown in FIGS. 2 and 3 and shows a plurality of intersecting constant time regions developed in practicing the present invention.

The operation of the radar system of FIG. 4 can readily be understood with reference to FIG. 5, depicting a plane along the elevation coordinate El($k$) indicated in FIG. 1. Following transmission of energy in a fan beam swept forward from Az(1) to Az(2) echoes arrive at the source 26 from a constant time region 98 during a time interval $t1_f$. Similarly, echoes reflected from the constant time regions 100, 102 and 104 arrive at source 26 during the respective time intervals $t2_f$, $t3_f$ and $t4_f$.

FIG. 5 also shows a series of constant time regions 106, 108, 110 and 112 from which echoes arrive during the time intervals $t1_r$, $t2_r$, $t3_r$ and $t4_r$, following transmission of a beam swept in the reverse direction.

The intersection of the regions 98 and 112 define a cell 114. To indicate targets in this cell, echoes must be received from the elevation coordinate El($k$) during both the time intervals $t1_f$ and $t4_r$. Assume that the coincidence circuit 82a of the FIG. 4 matrix 76, connected to conductors 84a and 86a, is associated with the cell 114. The conductor 86a accordingly receives pulses from the timing unit 78 at these two time intervals, as indicated. The conductor 84a receives echo signals that arrive from the elevation coordinate El(k) simultaneously with the pulse on the conductor 86a if there is a target in the cell 114.

The intersection of the constant time regions 98 and 110, (FIG. 5) defines a cell 116, and cells 118 and 120, respectively, are defined by the intersections of regions 100 and 112, and regions 100 and 110. Inasmuch as these cells are all located in the elevation coordinate El(k), the coincidence circuits 82 associated with them are also connected to the conductor 84a.

The matrix coincidence circuit 82b is associated with the cell 116 and accordingly the conductor 86b connected thereto receives timing pulses at the two time intervals $t1_f$ and $t3_r$. The conductor 86c connected to the coincidence circuit 82c associated with the cell 118 receives timing pulses at the two time intervals $t2_f$ and $t4_r$ and the conductor 86d connected to the coincidence circuit 82d associated with the cell 120 receives timing pulses at the two time intervals $t2_f$ and $t3_r$.

Still referring to FIGS. 4 and 5, assume that a target is in the cell 114 and another target is in the cell 116, and that no other targets are present. A transmitted beam swept in the forward direction illuminates both targets, causing them to reflect echoes that arrive at the source 26 during the same time interval $t1_f$. (The target-containing cells 114 and 116 are in the same forward sweep constant time region 98.) Accordingly, following transmission of the forward swept beam, the antennas 55 intercept the echoes and deliver echo signals to the elevation beam forming network 60. The network 60 delivers the echo signals (reflected from the elevation coordinate El(k)) to its output port 64.

During the time interval $t1_f$ following transmission of the forward swept beam, the timing pulses on the conductors 86a and 86b enable the coincidence circuits 82a and 82b to pass the echo signals received during that time interval to the accumulating stages of these coincidence circuits. Accordingly, the coincidence circuits 82a and 82b develop low level signals. Table 1 lists the accumulated level of the output signals from the coincidence circuits following each time interval.

The coincidence circuits 82c and 82d are enabled during the next time interval $t2_f$, but no echo signals are received during this interval and hence the output signals from these coincidence circuits remain essentially zero.

Following transmission of the forward swept beam, and after a brief delay in which the echo signals therefrom are received, energy is radiated in a beam swept in the reverse direction, again illuminating the targets in the cells 114 and 116. The echo from the target in the cell 116, formed by the constant time region 110, arrives at the source 26 during the time interval $t3_r$ and the echo signal from the cell 114, in the constant time profile 112, arrives during the time interval $t4_r$.

These echoes are again intercepted by the antennas 55 and passed to the beam forming network 60, which delivers them to its output port 64, connected to the matrix conductor 84a. During the first two reverse sweep time intervals, $t1_r$ and $t2_r$, there are no echo signals present in the matrix (coincidence circuits receiving timing pulses during these intervals are not shown). However, during the next time interval $t3_r$, the timing pulses on the conductors 86b and 86d enable the coincidence circuits 82b and 82d to pass the echo signal reflected from the target in the cell 116 to the accumulating stages of these coincidence circuits. Accordingly, the output signal from the coincidence circuit at 82d is raised to the low level. However, the output from the coincidence circuit 82b is already at the lower level due to the echo signal it received during the time interval $t1_f$. Accordingly, as set forth in Table 1, the echo signal from the target in the cell 116, arriving during the time interval $t3_r$, raises the coincidence circuit's output signal to the higher level.

The timing pulse $t4_r$ enables the coincidence circuit 82a to pass the echo signal reflected from the cell 114 to its accumulating stage and combine it with the echo signal passed during the time interval $t1_f$. Hence, the coincidence circuit 82a has a higher level output signal. The timing pulse $t4_r$ also enables the coincidence circuit 82c to pass the echo signal from the target in cell 114 to its accumulating stage. This raises the output signal from the circuit 82c to the lower level.

In this manner, after the receipt of the echoes from the two successive transmitted beams swept in opposite directions, the coincidence circuits 82a and 82b apply high level signals to the conductors 90a and 90b and the coincidence circuits 82c and 82d apply low level signals to the conductors 90c and 90d.

The commutator 92 successively couples each of the conductors 90 to the amplitude discriminator 94. The discriminator does not pass the low level signal on the conductor 90d. Hence, when the commutator 92 identifies

TABLE 1

| Coincidence Circuit | Time Interval | | | | | | | |
| --- | --- | --- | --- | --- | --- | --- | --- | --- |
| | $t1_f$ | $t2_f$ | $t3_f$ | $t4_f$ | $t1_r$ | $t2_r$ | $t3_r$ | $t4_r$ |
| 82a | low level | low† level nc* | low level nc | low level nc | low level nc | low level nc | low level nc | high level |
| 82b | low level | low level nc | low level nc | low level nc | low level nc | low level nc | high level | high level nc |
| 82c | zero nc | zero | zero nc | zero nc | zero nc | zero nc | zero nc | lwo level |
| 82d | zero nc | zero | zero nc | zero nc | zero nc | zero nc | low level | low level nc |

* nc = No connection.
† = With the coincidence circuits discussed below, the level is somewhat less than the low level.

*Level of accumulated output signal from coincidence circuits of the El(k) matrix intersections when targets are in cells 114 and 116*

The simplified representation of the matrix 76 of FIG. 4 does not include the coincidence circuits associated with cells from which echo signals arrive during the time intervals $t3_f$ and $t4_f$. However, in the present example, where targets are located only in the cells 114 and 116, no echo signals would arrive during these time intervals.

the cell 120 at the terminal 95, no signal appears at the terminal 96. However, when the commutator advances to couple the matrix output conductor 90b through the amplitude discriminator 94 to the output terminal 96, the amplitude discriminator passes the high level signal on the conductor 90b to the output terminal 96. This signal indicates that there is a target in the cell 116, which the commutator simultaneously identifies at the cell identification terminal 95. Similarly, the amplitude discriminator does not produce an output when it receives the low level signal on the conductor 90c but it does produce a target alarm or similar signal at the terminal 96 when it receives the high level signal present on the conductor 90a. This target alarm indicates that a target is in the cell 114 which is simultaneously identified at the terminal 95

The commutator 92 appropriately couples the conductors 90 to the discriminator 96 after reception of echoes from two successive groups of transmitted beams and before reception of echoes from subsequently transmitted beams.

In the event that it is desired to continuously monitor each output conductor 90 of the matrix 76, the commutator 92 is not used and an amplitude discriminating device (not shown) is connected to each conductor 90. Such an amplitude discriminating device, as the amplitude discriminator 94, is, in essence, a switch that blocks signals whose amplitudes are less than a selected threshold level and that passes signals with amplitudes greater than the threshold level. A Zener diode is such a device, or reverse-biased, forward-conducting diodes can provide the desired operation. Alternatively, more elaborate electronic switching can be used.

Although only a few coincidence circuits 82 associated with the single elevation coordinate El($k$) have been described in detail, the complete matrix 76 includes similar coincidence circuits connected to the timing pulse conductors 86 and the conductors 84b, 84c and 84d that respectively receive echo signals arriving in the azimuth coordinates El($l$), El($m$) and El($n$). Expanding to greater elevation and azimuth coverage than shown in the simplified FIGS. 1–3, the matrix 76 can have many hundreds or even thousands of coincidence circuits 82, each such circuit being associated with a different cell in the field of view under surveillance.

The timing unit 78 shown in FIG. 4 includes a clock and a distributor which distributes pulses from the clock among various conductors 86. The distributor may, for example, incorporate a plurality of delay circuits which delay each clock pulse by different amounts before delivering it to the respective conductors 86.

As mentioned above, in some installations it may be desirable to transmit a group of beams swept in the forward direction before transmitting a successive group of beams swept in the reverse direction. The output target indications are then developed only after echoes from the two successive groups of transmitted beams have been accumulated. Searching a single sector of space in this manner is often desirable to increase the signal-to-noise ratio of the echo signals delivered to the matrix 76 and to minimize the effect of spurious signals intercepted by the antennas 55.

For this operation, the sweep reverse unit 56 causes the beam sweeping network 52 to sweep successive transmitted beams in the same direction for the selected number of beams and then reverses the direction in which the next group of beams are swept. The reversing unit 56 is also connected with a reverse control 78a in the timing unit 78 so that the timing unit repetitively delivers timing signals to the matrix conductor 86 in accordance with the receipt of echoes following forward swept beams until the beam sweeping network 52 is commanded to reverse the sweep direction. The timing unit then delivers to the matrix 76 the timing signals that correspond with the receipt of echoes reflected from reverse swept transmitted beams, until the sweep again assumes the forward direction.

Matrix coincidence circuits

Figure 6:
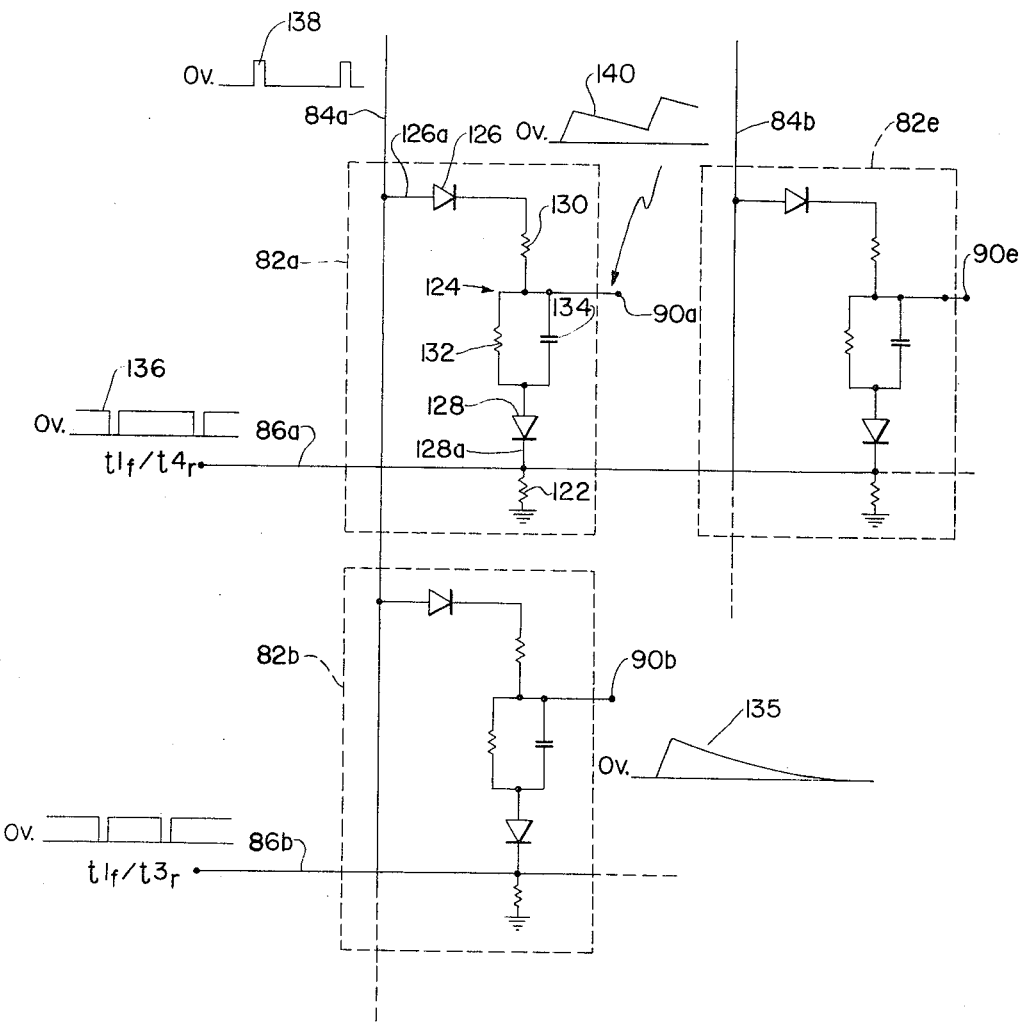
FIG. 6 is a detailed schematic representation of coincidence circuits in the matrix of FIG. 4.

FIG. 6 shows in detail an embodiment of the accumulating coincidence circuits 82a, 82b and 82e. The circuit 82a, which is typical of the other coincidence circuits, has a voltage divider 124 in series between diodes 126 and 128. The anode 126a of the diode 126 is connected with the conductor 84a to receive echo signals and the cathode 128a of the diode 128 is connected with the conductor 86a to receive timing pulses. A resistor 122 connects the cathode 128a to a common ground. The voltage divider 124 comprises two series-connected resistors 130 and 132 and an accumulating capacitor 134 is connected in parallel with the resistor 132. The output conductor 90a is connected to the junction between the resistors 130 and 132.

During operation of the circuit 82a, the timing unit 78 maintains a positive potential on the conductors 86 except during a timing pulse, when the potential drops to zero, as illustrated by the voltage waveform 136 adjacent to the conductor 86a in FIG. 6. This positive potential on the conductor 86a reverse biases the diode 128, maintaining the diode non-conducting. When the beam forming network 60, FIG. 4, impresses a positive echo signal, as represented in FIG. 6 by the voltage waveform 138, the diode 128 prevents passage of current through the voltage divider 124 and capacitor 134. Accordingly, in the absence of a timing pulse on the conductor 86a, echo signals present on the conductor 84a do not affect the charge on the capacitor 134, to which the output conductor 90a is connected.

However, when an echo signal on the conductor 84a coincides with a timing pulse on the conductor 86a, the timing pulse removes the reverse bias from the diode 128, thereby enabling the diodes 126 and 128 to conduct in response to the echo signal. As a result, the resistors 130 and 132 pass current from the echo signal and the capacitor 134 charges to the portion of the echo signal voltage developed across the resistor 132. Thereafter, the voltage across the capacitor 134 slowly discharges through the resistor 132, as indicated in the voltage waveform 140 adjacent to the conductor 90a.

When an echo signal is again applied to the conductor 84a following the next transmission of energy, the second timing pulse in the waveform 136 again enables the circuit 122 and the voltage across the capacitor 134 is increased to the higher level. In this manner, the coincidence circuit 82a accumulates the echo signals it receives during the time intervals that it is enabled.

For operation in a radar system in which successive beams are swept in opposite directions, the coincidence circuit 82a appropriately discharges one-half its charge in the period between transmission of successive beams. As a result, when the coincidence circuit does not receive an echo signal from a transmitted beam, the voltage across the capacitor 134 discharges substantially completely by the time the next beam is transmitted. This is illustrated in FIG. 6 with the coincidence circuit 82b, which receives a timing signal when the first echo signal (waveform 138), reflected from a forward-swept beam, is present but not when the second echo signal, reflected from a reverse-swept beam, is present. Hence, the voltage to ground at conductor 90b, indicated with waveform 135, rises in response to the first echo signal and then decays substantially to zero before transmission of the next forward-swept beam.

The coincidence circuits at the remaining intersections of the matrix 76 preferably have the same construction and operate in the same manner, accumulating the echo signals received from the elevation coordinate and from the azimuth and range coordinates associated with each matrix intersection. With this operation, the radar system produces a target indication only when echoes are received from the same cell in response to successive groups of beams swept in opposite directions.

The diodes 126 serve to isolate the coincidence circuits connected to the same conductor 84. The resistor 130 of the voltage divider 134 is a current limiting device which permits the capacitor 134 to accumulate charge during a plurality of echo signals. This is particularly important when echoes from a group of forward swept beams and from a group of reverse swept beams are accumulated to produce a target indication.

It will be apparent that other constructions can alternatively be used for the coincidence circuits 82 and in place of the accumulating capacitor 134. For example, according to one technique the coincidence circuit utilizes a filter that passes signals having a period equal to the time between transmission of successive beams and does not pass signals having a larger period, for example twice as large (assuming sweep reversal on alternate transmitted pulses). According to still another technique, digital logic circuits can be used to indicate the receipt of two echo signals in a selected time interval.

*Providing greater resolution*

Figure 7:
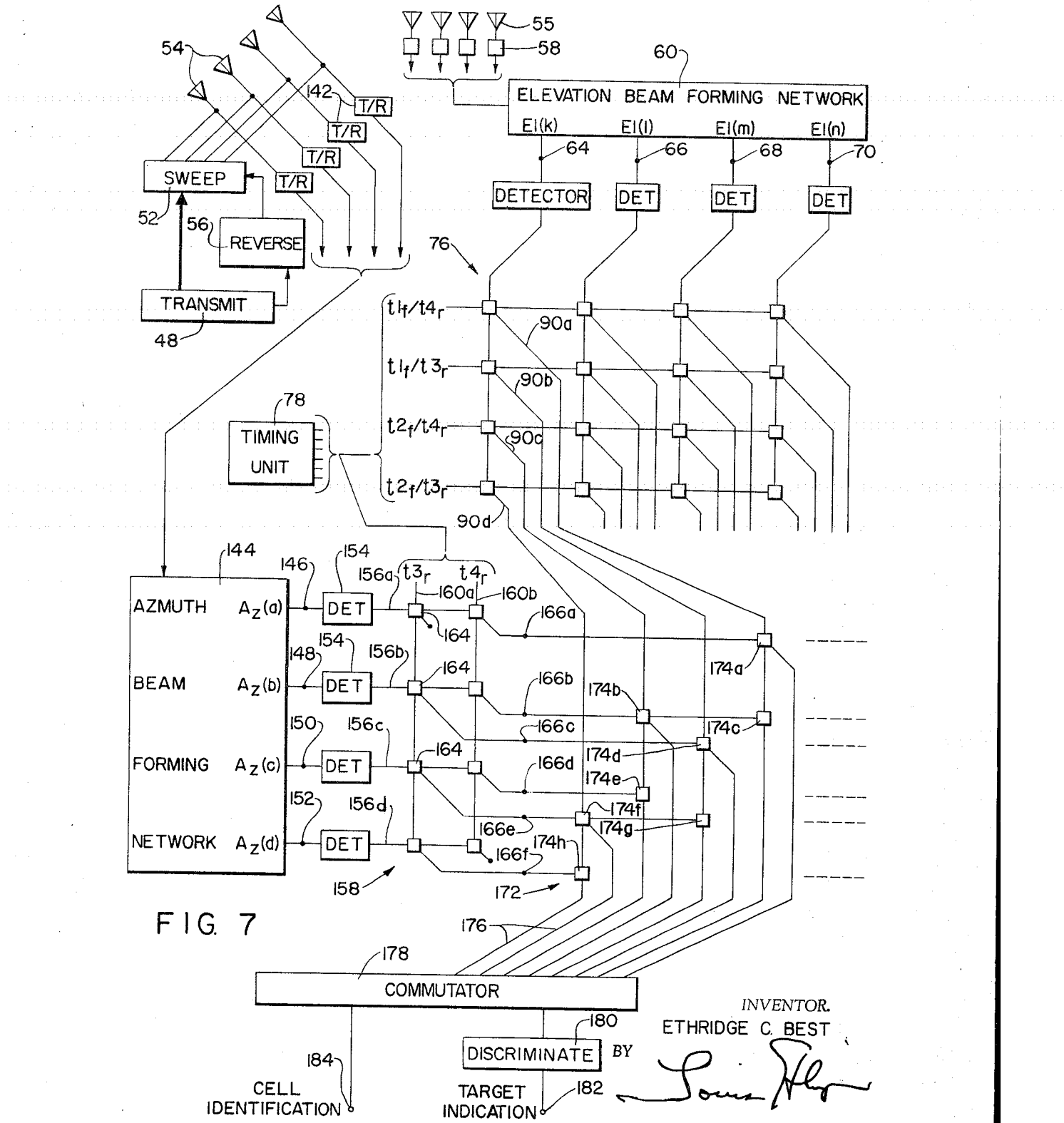
FIG. 7 is a schematic representation in block form of another radar system embodying the invention and particularly suited for locating targets with high resolution.

FIG. 7 shows another embodiment of the invention similar to that of FIG. 4, but has additional apparatus for providing greater resolution along the azimuth axis, along which the beams of transmitted energy are swept. The resolution along the elevation axis is determined by the antennas 55 and the beam forming network 60 (FIG. 4), which can be constructed according to known techniques to provide the desired elevation resolution.

The high azimuth resolution radar system of FIG. 7 is like that of FIG. 4 in that it has a transmitter 48 connected with a beam sweeping network 52 to transmit from antennas 54 fan-shaped beams of energy swept along the azimuth axis. The sweep reversing unit 56 is connected between the transmitter and beam sweeping network, and the protective switching devices 58 are connected between each antenna 55 and the elevation beam forming network 60, which classifies the received echo signals at output ports 64, 66, 68 and 70 according to the elevation direction from which they arrive. After detection in detectors 72, the echo signals from the beam forming network 60 are applied to the matrix 76 that delivers accumulated echo signals to output conductors 90 corresponding to the cells from which the echoes are reflected.

In addition, the antennas 54 intercept echoes and deliver echo signals, through transmit/receive devices 142, to an azimuth beam forming network 144 that delivers to its first port 146 the echo signals that arrive from the azimuth coordinate Az(a) (FIG. 1) and delivers to its port 148, 150 and 152, respectively, the echo signals arriving from the azimuth coordinates Az(b), Az(c) and Az(d).

After detection in detectors 154, the echo signals received from each azimuth coordinate are applied to corresponding conductors 156 of a matrix indicated generally at 158. The other set of matrix conductors 160 receives timing signals from the timing unit 78. At each matrix intersection a conductor 156 is connected to the signal input of the same gate.

When an echo signal is present on a conductor 156 during the time interval a timing pulse on a conductor 160 enables the gate 164 at the intersection of the two conductors, the enabled gate passes the echo signal to an output conductor 166 of the matrix 158 associated with that intersection.

The timing unit 78 appropriately delivers timing pulses to the conductors 160 during receipt of echoes from either the forward-swept or the reverse-swept transmitted beams; there is no need for the matrix 158 to accumulate echo signals from sweeps in both directions. For example, in the illustrated system, the matrix conductors 160a and 160b receive timing pulses during receipt of echoes from reverse-swept beams.

Referring again to FIG. 5, depicting an illustrative application of the radar techniques of the present invention, the cells 114, 116, 118 and 120 in which the radar system of FIG. 4 locates targets are seen to be disposed along the azimuth coordinates Az(a), Az(b), Az(c) and Az(d). To increase the azimuth resolution with which targets are located in these cells, the azimuth beam forming network 144 of FIG. 7 delivers the echo signals that arrive from different azimuth directions to different output ports 146–152 so that only echo signals arriving from the azimuth coordinate Az(a) are present on the matrix conductor 156a; and the matrix conductors 156b, 156c and 156d, respectively, have echo signals arriving only from the azimuth coordinates Az(b), Az(c) and Az(d). The timing unit 78 then delivers timing pulses to the matrix conductor 160a during the time interval $t3_r$ and delivers timing pulses during the time interval $t4_r$ to the matrix conductor 160b.

With this operatitn, the gate 164 connected at the matrix intersection of the conductors 156a and 160b delivers to the matrix output conductor 166a the echo signal present on the conductor 156a during the interval the timing pulse $t4_r$ is present. This output signal indicates that a target is in the space column, similar to the column 44 of FIG. 3, formed by that portion of the constant time region 112, FIG. 5, that lies within the azimuth coordinate Az(a). Inspection of FIG. 5 shows that this column extends in elevation through the portion 114a of cell 114.

Table 2 lists the cell portions that signals at the matrix output conductors 166 identify in the manner just described for the conductor 166a. For completeness, the table includes portions of cells 115, 117, 119 and 121 (FIG. 5) that have not been discussed previously.

TABLE 2

| Matrix Output | Corresponding Gate Inputs | El(k) Cell Portions in the Corresponding Column |
|---|---|---|
| 166a | Az(a) and $t4_r$ | 114a and 115b |
| 166b | Az(b) and $t4_r$ | 114b and 118a |
| 166c | Az(b) and $t3_r$ | 116a and 117a |
| 166d | Az(c) and $t4_r$ | 118b and 119a |
| 166e | Az(c) and $t3_r$ | 116b and 120a |
| 166f | Az(d) and $t3_r$ | 120b and 121a |

*Cell portions, FIG. 5, identified by outputs of matrix 158, FIG. 7*

It will thus be seen that the beam forming network 144 and the matrix 158, in effect, divide the azimuth length of each cell 114–120 into two portions, thereby essentially doubling the azimuth resolution with which targets can be located. The manner in which this increased resolution information is combined with the unambiguous target indications provided with the beam forming network 60 and the matrix 76 will now be described with further reference to FIG. 7.

The output conductors 166 of the matrix 158 and the output conductors 90 of the matrix 76 form a third matrix indicated generally at 172.

At each intersection of the matrix 172, the conductors 90 and 166 forming the intersection are connected to the input terminals of a coincidence circuit 174 having an output conductor 176. The coincidence circuits can suitably be AND circuits, e.g., gates such as the gates 164 of the matrix 158. A commutator 178 receives the signals on the conductors 176 and couples them in succession to an amplitude discriminator 180 whose output is applied to a Target Indication terminal 182. The discriminator 180 serves the same purpose as the discriminator 94 discussed above with reference to FIG. 4. The commutator 178 also delivers to a Cell Identification terminal 184 information that continuously identifies the successive output conductors 176 coupled to the terminal 182.

Although, for simplicity FIG. 7 shows only a portion of the matrix 172 in the complete network, it will be apparent that the signals from the matrix 158 are combined in the same manner with all the signals from the matrix 76, not only with those indicating targets in the elevation coordinate El(k) as shown.

The coincidence at a coincidence circuit 174 of a high level signal from the matrix 76 and a signal from the matrix 158 indicates that a target is located in an azimuth-classified portion of a cell. For example, examination of FIG. 7 reveals that coincidence of signals on conductors 90a and 166a at the coincidence circuit 174a indicates that a target is in the cell portion 114a, which lies along the azimuth coordinate Az(a) and along the elevation coordinate El(k). The remaining coincidence circuits 174 are similarly associated with FIG. 5 cell portions at the elevation El(k) as follows:

| Matrix intersection: | Cell portion |
| --- | --- |
| 174a | 114a |
| 174b | 118a |
| 174c | 114b |
| 174d | 116a |
| 174e | 118b |
| 174f | 120a |
| 174g | 116b |
| 174h | 120b |

The system of FIG. 7 thus markedly increases the resolution along the azimuth axis with which targets are located with the radar system of FIG. 4; the resultant azimuth resolution corresponds to the resolution with which the azimuth beam forming network 144 classifies echo signals.

The azimuth resolution and the range resolution of the radar system of FIG. 4 can also be increased, by reducing the thickness, along the range coordinate, of the constant time regions whose intersections define the cells of FIG. 5. This can be achieved by increasing the speed with which the transmitted beams are swept in azimuth, and by shortening the timing pulses by a corresponding amount.

Summary

In summary, the radar technique of the present invention locates targets with practically zero ambiguity by responding only to the receipt of echoes reflected from two successive groups of transmitted beams swept in opposite directions. That is, a radar system embodying the invention indicates the presence of a target only when it receives echoes from the same range in response to transmitted energy swept in opposite directions.

A preferred embodiment of the invention achieves this result by classifying the echo signals according to the coordinate from which they arrive along a second axis that is transverse to the range axis and to the first axis along which the transmitted beams are swept. The resolution with which targets are located along the second axis is determined by the directivity along this axis of the multiple-beam antenna and beam forming system that receives the echoes.

The resolution along the range axis and along the first axis depends on the duration of the time intervals into which the echoes are classified and on the sweep rate. The resolution along the first axis can also be increased by making use of a second beam-forming system which classifies the echo signals according to the coordinate, along this axis, from which they arrive.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described the invention, what is claimed as new and secured by Letters Patent is:

1. In echo-type radio detection in which reflections of energy radiated in a beam are detected to indicate the position of an energy-reflecting object, an improvement for eliminating indications of non-existing objects, said improvement comprising the steps of transmitting successive groups of radiated beams in different modes, each mode producing, from each of a plurality of space locations, a reflection that returns, following initiation of the mode, at an interval different from the return interval of at least one other mode from the same space location, said modes producing from different space locations, reflections returning at different sets of intervals following initiation of said modes, and combining with reflections produced from one mode only those reflections produced from another mode which are reflected from the same space location.

2. In echo-type radio detection in which reflections of energy radiated in a swept beam are intercepted to locate energy-reflecting objects and reflections intercepted at the same time are reflected from a constant time region, an improvement for eliminating indications of non-existent objects, said improvement comprising the steps of reversing the sweep direction of the radiated energy so that reflections from the same range arrive from different constant time regions, and combining reflections produced from energy swept in different directions only when the reflections are from the intersection of different constant time regions.

3. A radar method characterized by relative freedom from indications of non-existent energy reflectors, said method comprising the steps of
 (A) illuminating a sector of space with energy radiated in a beam swept along a first axis,
 (B) reversing the sweep direction of successive groups of said beams,
 (C) intercepting echoes of said radiated energy,
 (D) classifying said intercepted echoes as to the direction and range from which they are intercepted, and
 (E) correlating echoes intercepted in response to sucsive groups of radiated beams swept in opposite directions.

4. A radar method characterized by relative freedom from indications of non-existent energy reflectors, said method comprising the steps of
 (A) radiating electromagnetic energy in a beam swept along a first axis,
 (B) reversing the sweep direction of successive groups of said beams,
 (C) intercepting echoes of said radiated energy,
 (D) accumulating the intercepted echoes that stem from the same space location as defined by the intersection of forward-sweep and reverse-sweep constant time regions, and
 (E) identifying the space locations from which echoes are intercepted in response to successive groups of radiated beams swept in opposite directions.

5. The method defined in claim 4 in which said accumulating and identifying steps comprise
 (A) passing to each of a plurality of accumulating means the echoes intercepted during a given time interval following radiation of a group of successive forward-swept beams and the echoes intercepted during a given time interval following radiation of a group of successive reverse-swept beams, so that said accumulating means receives only the echoes reflected from one of said space locations, and
 (B) sensing the receipt at each accumulating means of echoes reflected in response to successive groups of radiated beams swept in opposite directions.

6. A radar method characterized by relative freedom from indications of non-existent energy reflectors, said method comprising the steps of
 (A) illuminating a sector of space with energy radiated in a beam swept along a sweep axis;
 (B) reversing the sweep direction of successive groups of said beams;
 (C) intercepting echoes of said energy;
 (D) determining the combinations of two time intervals, one following transmission of energy swept in the forward direction and the other following transmission of energy swept in the reverse direction, during which echoes are intercepted from the same space location;
(E) separately accumulating echoes intercepted during each of said combinations of time intervals, thereby to separately accumulate echoes reflected from each location;
(F) identifying each location from which echoes are intercepted
(1) during both time intervals in said combination thereof associated with the location
(2) in response to successive groups of radiated beams swept in opposite directions.

7. The method defined in claim 6 comprising the further steps of
(A) intercepting echoes of said energy in an ordered array of second beams, each second beam being directive along an axis of high resolution,
(B) classifying the echoes intercepted in said second beams according to the constant time regions from which they are reflected, and
(C) identifying each second beam in which an intercepted echo is reflected from an identified location,
(D) thereby to increase the resolution with which energy reflectors are located along said axis of high resolution.

8. The method defined in claim 7 in which said sweep axis and said axis of high resolution are the same.

9. A radar method characterized by relative freedom from indications of non-existent energy reflectors, said method comprising the steps of
(A) illuminating a sector of space with energy radiated in a beam swept along a first axis;
(B) reversing the sweep direction of successive groups of said beams;
(C) intercepting echoes of said energy in an ordered array of second beams, each of which is directive along a second axis;
(D) determining the combinations of two time intervals, one interval following transmission of energy swept in a first direction and the other interval following transmission of energy swept in a second direction opposite to said first direction, during which echoes are intercepted from the same space cell;
(E) accumulating echoes intercepted in each second beam during the two time intervals in each combination thereof, thereby to accumulate the echoes received from the same space cell, and
(F) identifying the cells from which echoes are intercepted from at least two successive groups of transmitted beams.

10. The method defined in claim 9 in which said cell identifying step comprises the steps of
(A) producing a signal corresponding in amplitude to the accumulated echoes intercepted from a first space cell, and
(B) producing a target indication identifying said first cell when said signal exceeds a selected amplitude.

11. A radar method characterized by relative freedom from indications of non-existent targets, said method comprising the steps of
(A) radiating energy in a fan beam that extends along a first axis and is swept along a second axis, said energy being effectively continuous throughout each sweep,
(B) reversing the sweep direction along said second axis of successive groups of said beams,
(C) intercepting echoes of said energy with a multiple-beam antenna system that delivers to different output ports thereof the echo signals received in different second beams directive along said first axis,
(D) producing pairs of timing signals wherein one timing signal occurs during the receipt of echoes reflected from a space cell in response to energy swept in a forward direction and the other timing signal occurs during the receipt of echoes reflected from the same space cell in response to energy swept in the reverse direction,
(E) applying said echo signals at said output ports of said antenna system to an accumulating network having a separate accumulating means identified with each cell,
(1) each accumulating means receiving the echo signals reflected from the cell with which it is identified,
(F) applying each pair of timing signals to the accumulating means that are identified with the cells from which echoes are received during the corresponding time intervals
(1) to accumulate separately the echo signals received from each cell, and
(G) identifying the accumulating means that receive echo signals in response to two successive groups of transmitted beams swept in opposite directions, thereby to identify the cells in which targets are located.

12. The method defined in claim 11 comprising the further steps of
(A) intercepting echoes of said transmitted energy with a second multiple-beam antenna system that delivers to different output ports thereof the echo signals received in different third beams directive along said second axis,
(B) applying the echo signals at said ports of said second antenna system to a coincidence network having coincidence means identified with portions of said space cells,
(1) said space cell portions that are identified with the same coincidence means being
(a) within the same constant time region and
(b) within the same third beam,
(2) each coincidence means receiving the echo signals that are reflected from the cell portions with which it is identified,
(C) applying at least one timing signal from each pair thereof to the coincidence means identified with the cell portions from which echoes are intercepted during the application of that timing signal,
(D) developing an output signal from each coincidence means in response to the coincidence therein of an echo signal and a timing signal,
(1) said outpt signal indicating the presence of a target in the cell portions with which that coincidence means is identified, and
(E) developing an output target indication in response to indication of a target both in a cell and a cell portion encompassed by it,
(1) said target indication identifying said encompassed cell portion.

13. Radar apparatus for detecting energy-reflecting objects with minimal ambiguity, said apparatus comprising, in combination,
(A) radiating means for illuminating a sector of space with electromagnetic energy transmitted successively in different modes, each mode producing, from each of a plurality of space locations, a reflection that returns, following initiation of the mode, at an interval different from the return interval of at least one other mode from the same space location, said modes producing, from different space locations, reflections returning at different combinations of time intervals following initiation of said modes,
(B) antenna means for intercepting reflections of said radiated energy, and
(C) a plurality of sensing means, each sensing means
(1) receiving intercepted reflections,
(2) registering only the receipt of reflections during the time intervals during which reflections are intercepted from one space location, and (3) producing an output signal in response to registration of reflections from successive transmissions of energy in different modes.

14. The apparatus defined in claim 13
 (A) in which said radiating means illuminates said sector of space with a beam of energy swept along a first axis and reverses the sweep direction of successive groups of said beams, and
 (B) said sensing means produces said output signal in response to registration of reflections from an intersection of a forward-sweep constant time region and a reverse-sweep constant time region.

15. The apparatus defined in claim 14
 (A) in which said antenna means comprises a multiple-beam network that identifies the coordinates along a second axis from which said reflections arrive, and
 (B) each sensing means registers the receipt of reflections from one coordinate along said second axis.

16. In a crossed-line array radar system wherein echoes of energy radiated in a beam swept along a first axis are intercepted to provide position information of energy-reflecting objects, apparatus for eliminating indications of non-existent objects, said apparatus comprising
 (A) sweep reversing means for reversing the sweep direction of successive groups of said radiated beams, and
 (B) echo signal processing means responsive to the arrival of echoes from the same range and same position along said first axis in response to radiated beams swept in opposite directions.

17. A crossed-line array radar system detecting energy-reflecting objects with minimal ambiguity, said system comprising in combination,
 (A) radiating means illuminating a sector of space with energy radiated in a beam swept along a first axis;
 (B) sweep reversing means coupled with said radiating means and reversing the sweep direction of successive groups of said beams;
 (C) antenna means intercepting reflections of said radiated energy and developing echo signals in response thereto;
 (D) locating means
  (1) receiving said echo signals from said antenna means, and
  (2) identifying the constant time region, from which each echo signal is reflected; and
 (E) output means developing output signals identifying the space columns, as delineated by the intersection of forward-sweep constant time regions and reverse-sweep constant time regions, in which there are energy-reflecting objects,
  (1) said output means being in circuit with said locating means and developing each output signal in response to the receipt of echo signals from intersecting forward-sweep and reverse-sweep constant time regions.

18. A crossed-line array radar system locating energy-reflecting objects with minimal ambiguity, said system comprising, in combination,
 (A) source means illuminating a sector of space with energy radiated in a beam swept along a first axis,
 (B) sweep reversing means coupled with said source means and reversing the sweep direction of successive groups of said beams,
 (C) antenna means intercepting echoes of said radiated energy,
 (D) accumulating means connected with said antenna means and separately accumulating the intercepted echoes that are reflected from the same space location as defined by the intersection of forward-sweep and reverse-sweep constant time regions, and
 (E) output means connected with said accumulating means and identifying each space location from which intercepted echoes arrive in response to two successive groups of radiated beams swept in opposite directions.

19. The combination defined in claim 18 in which said accumulating means comprise
 (A) timing means producing combinations of timing signals, one timing signal in each combination occurring during interception of echoes reflected from a space location in response to energy swept in a forward direction and the other timing signal occurring during the interception of echoes reflected from the same location in response to energy swept in the reverse direction, and
 (B) echo registering means, each of which accumulates echoes received during the timing signals in one combination thereof.

20. A cross-line array radar system for locating energy-reflecting objects with minimal ambiguity, said system comprising, in combination,
 (A) source means illuminating a sector of space with energy radiated in beams swept along a sweep axis,
 (B) sweep reversing means coupled with said source means and reversing the sweep direction of successive groups of beams,
 (C) multiple-beam antenna means intercepting echoes of said energy and delivering to different output terminals thereof, the echo signals developed in response to echoes intercepted from correspondingly different coordinates along a first search axis,
 (D) timing means developing combinations of two timing signals, each combination being associated with a space location as defined by the intersection of a forward-sweep constant time region and a reverse-sweep constant time region,
  (1) one signal in each combination occurring during interception of echoes reflected from the associated space location in response to energy swept in the forward direction and the other timing signal occurring during the interception of echoes reflected from the same location in response to transmitted energy swept in the reverse direction,
 (E) an accumulating network having a plurality of accumulating means, each of which is associated with a space cell as defined by the intersection of a coordinate along said first search axis and a space location, each accumulating means
  (1) receiving the echo signals from an antenna output terminal and the combination of timing signals associated with the corresponding space location,
  (2) responding only to echo signals it receives during the presence of a timing signal, and
  (3) developing a cell-identifying target indication when it receives echo signals during both time intervals that it receives timing signals following radiation of successive groups of beams swept in opposite directions,
  (4) so that each accumulating means develops an output signal only when echoes are intercepted from the same space cell in response to successive groups of beams swept in opposite directions.

21. The combination defined in claim 20 in which each accumulating means comprises
 (A) signal storing means accumulating echo signals, and
 (B) gates means connected to receive the echo signal and the timing signal input to said accumulating means and responding to the coincident receipt thereof to pass a signal to said storage means.

22. The combination defined in claim 20 in which said accumulating network comprises a matrix network formed with first and second signal paths, (A) each of said first signal paths being connected with a different output terminal of said antenna means and receiving the corresponding echo signal,
(B) each of said second signal paths being connected to said timing means and receiving a different combination of timing signals,
(C) coincidence means
(1) connected at the matrix intersections of a first signal path and a first search signal path respectively associated with a second axis coordinate and space location that define a space cell, and
(2) developing a cell-identifying output signal in response to the receipt of echo signals during the intervals it receives timing signals following transmission of a group of forward-swept beams and the successive group of reverse-swept beams.

23. The combination defined in claim 20 further comprising
(A) second multiple-beam antenna means intercepting echoes of said transmitted energy and delivering to different output terminals thereof the echo signals developed in response to echoes intercepted from different coordinates along a second search axis,
(B) means classifying the echoes intercepted in each second search axis coordinate according to the constant time regions from which they are reflected,
(C) output means identifying each second search axis coordinate in which an intercepted echo is reflected from a portion of an identified cell.

24. The combination defined in claim 23 in which said sweep axis and said second search axis are the same.

25. Radar apparatus comprising, in combination,
(A) a transmitter,
(B) antenna means,
(C) a beam sweeping unit connected between said transmitter and said antenna means and phasing the transmitter energy delivered to the output of said antenna means to cause the energy to be radiated in a beam swept along a first axis,
(D) a sweep reverse unit connected with said beam sweeping unit and reversing the sweep direction of successive groups of transmitted beams,
(E) a multiple beam antenna system intercepting echoes of said energy and delivering to different ports thereof echo signals intercepted from different coordinates along a second axis,
(F) a timing unit developing different combinations of two timing signals,
(1) the two timing signals in each combination thereof being present during the forward-sweep and reverse-sweep time intervals during which echoes are intercepted from one space column,
(G) a plurality of first coincidence circuits, each of which is identified with a different space cell as defined by the intersection of a coordinate along said second axis and a space column, each first coincidence circuit
(1) receiving from said multiple beam antenna system the echo signals intercepted along the corresponding second axis coordinate,
(2) receiving from said timing unit the combination of timing signals associated with its corresponding space column, and
(3) developing a first output signal in response to receipt of echo signals reflected from two successive groups of transmitted beams swept in opposite directions during the time intervals the circuit receives timing signals, and
(H) output means connected with said coincidence circuits and identifying, in response to said first output signals, the cells in which energy-reflecting objects are located.

26. The apparatus defined in claim 25 further comprising,
(A) a multiple beam forming network receiving echo signals from said antenna means and delivering to different output ports thereof the echo signals intercepted from different coordinates along said first axis,
(B) second coincidence circuits each of which is identified with portions of cells,
(1) said cell portions identified with the same second coincidence circuit being within the same constant time region and within the same coordinate along said first axis,
(2) each second coincidence circuit receiving from said multiple beam forming network the echo signals intercepted from the corresponding coordinate along said first axis and receiving from said timing unit the timing signal during which echoes are intercepted from the constant time region associated with the cell portions identified with that second coincidence circuit,
(3) each second coincidence circuit developing a second output signal in response to the coincidence of the echo signal and the timing signal received thereby,
(C) a matrix network formed by first and second sets of conductors
(1) each conductor in said first set thereof carrying the output signal from one of said first coincidence circuits and
(2) each conductor in said second set thereof carrying the output signal from one of said second coincidence circuits, and
(D) third coincidence circuits in said matrix network, each of said third circuits being connected with a conductor in said first set and a conductor in said second set respectively associated with a space cell and a cell portion encompassed by said space cell,
(1) each third coincidence circuit developing a target indication in response to the receipt of signals on said first set conductor and said second set conductor to which it is connected.

27. In echo-type radio detection apparatus wherein reflections of energy radiated in a beam are detected to provide position information of energy-reflecting objects, apparatus for eliminating indications of non-existing objects, said apparatus comprising
(A) transmitter mode-changing means for radiating successive groups of radiated beams in different modes, each mode producing, from each of a plurality of space locations, a reflection that returns, following initiation of the mode, at an interval different from the return interval of at least one other mode from the same space location, said modes producing, from different space locations, reflections returning at different combinations of time intervals following initiation of said modes, and
(B) echo-signal processing means producing target indications only in response to the arrival of echoes reflected from the same space location in response to radiated beams transmitted in different modes.

References Cited

UNITED STATES PATENTS

| | | | |
|---|---|---|---|
| 2,415,566 | 2/1947 | Rhea | 343—16.2 |
| 2,422,334 | 6/1947 | Bedford | 343—16.2 |
| 2,514,617 | 7/1950 | Albersheim | 343—10 |
| 3,056,129 | 9/1962 | Albersheim | 343—16 |

CHESTER L. JUSTUS, *Primary Examiner.*

R. E. KLEIN, *Assistant Examiner.*

UNITED STATES PATENT OFFICE
CERTIFICATE OF CORRECTION

Patent No. 3,364,484                                  January 16, 1968

Ethridge C. Best

It is hereby certified that error appears in the above numbered pent requiring correction and that the said Letters Patent should read corrected below.

Column 3, line 27, for "the echoes" read -- with echoes -- column 4, line 51, for ", a forming" read -- , forming --; columns 7 and 8, TABLE 1, ninth column, line 7 thereof, for "lwo" read -- low --; column 11, lines 14 and 15, for "axis, along" read -- axis, the axis along --; line 50, for "to the signal" read -- to the enable terminal of a gate 164 and a conductor 160 is connected to the signal --; column 18, line 31, for "signals, each" read -- signals, with each --.

Signed and sealed this 22nd day of July 1969.

(SEAL)
Attest:

EDWARD M. FLETCHER, JR.                          WILLIAM E. SCHUYLER,
Attesting Officer                                      Commissioner of Paten